UNITED STATES PATENT OFFICE.

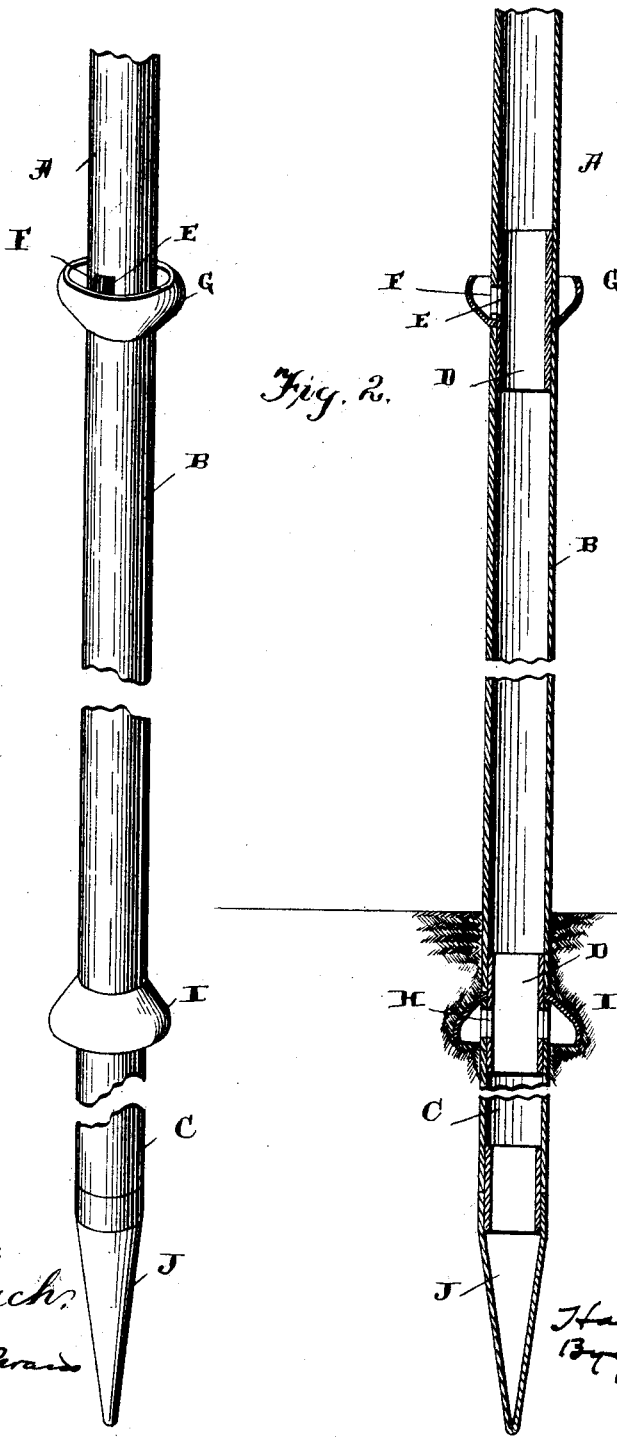

HARVEY SIMPSON, OF BURLINGTON, WISCONSIN.

LIGHTNING-ROD.

SPECIFICATION forming part of Letters Patent No. 538,603, dated April 30, 1895.

Application filed March 2, 1895. Serial No. 540,325. (No model.)

*To all whom it may concern:*

Be it known that I, HARVEY SIMPSON, of Burlington, in the county of Racine and State of Wisconsin, have invented certain new and useful Improvements in Lightning-Rods; and I do hereby declare the following to be a full, clear, and exact description of the invention, such as will enable others skilled in the art to which it pertains to make and use it, reference being had to the accompanying drawings, which form part of this specification.

My invention relates to an improvement in lightning rods; and the same is especially directed to the formation of an effective ground piece therefor.

The invention consists in the novel features of construction hereinafter fully described and claimed, and illustrated by the accompanying drawings, in which—
Figure 1 is a perspective view of the lower portion of a rod. Fig. 2 is a vertical sectional view of the same.

The lower portion of the rod is made up of sections A, B and C. Sections A and B are coupled by the internal sleeve D provided with a perforation E, and the lower end of section A is cut out at F to fit around said perforations. Between sections A and B is mounted the cup G on sleeve D for the purpose of catching the water which runs down the rod and diverting it into the interior of the rod through opening E. Sections B and C are coupled in a similar manner and provided with the outlets H, and arranged on the internal coupling sleeve is cup or collar I in a reverse position to cover opening H and prevent the earth from filling therein. Section C is closed by the tapering plug J whereby the rod may be readily forced into the ground.

When in position cup G is above the surface of the ground while opening H and collar I are beneath the same. The object is to confine water in the lower end of the rod so that there will be sufficient moisture to maintain a proper contact, while opening H serves as an overflow to keep the ground around the base of the rod moistened and in proper condition.

Having thus fully described my invention, what I claim, and desire to secure by Letters Patent, is—

1. An improved lightning rod tubular at its lower end and closed at its extremity, the opening in the rod and the cup arranged adjacent the same to divert the water into said opening, the outlet opening beneath the first named opening, and the shield for said outlet opening.

2. An improved lightning rod tubular at its lower end and formed of the sections A, B and C, the perforated sleeves connecting the said sections in succession, the cup at the junction of sections A and B, and the shield at the junction of sections B and C, and a tapering plug for closing the lower end of section C, substantially as shown and described.

In testimony whereof I affix my signature in presence of two witnesses.

HARVEY SIMPSON.

Witnesses:
H. REWALD,
F. REUSCHLEIN.